United States Patent [19]

Smith-Johannsen

[11] 4,321,295

[45] Mar. 23, 1982

[54] MODIFIED GRAPHITE AND PROCESS FOR USING SAME

[75] Inventor: Robert Smith-Johannsen, Menlo Park, Calif.

[73] Assignee: Ramu International, New Canaan, Conn.

[21] Appl. No.: 106,163

[22] Filed: Dec. 21, 1979

Related U.S. Application Data

[63] Continuation of Ser. No. 863,972, Dec. 23, 1977, abandoned.

[51] Int. Cl.³ ............................................. B32B 5/16
[52] U.S. Cl. ..................................... 428/206; 252/29; 252/49.3; 427/220; 427/212; 428/403
[58] Field of Search ....................... 428/206, 403, 405; 252/29, 49.3, 49.5; 106/307; 423/448; 427/220, 212

[56] References Cited

U.S. PATENT DOCUMENTS 3,518,191  6/1970  Groszek .................................. 252/29
3,532,625  10/1970  Groszek .................................. 252/29
3,992,558  11/1976  Smith ................................... 427/213

*Primary Examiner*—Sam Silverberg
*Attorney, Agent, or Firm*—Pennie & Edmonds

[57] ABSTRACT

Graphite compositions in which the majority of the flake-like particles have at least two substantially hydrophobic surfaces or areas and at least one substantially hydrophilic area of sufficient hydrophilicity to retain the water dispersibility of the graphite compositions and which are used as coatings on hydrophobic surfaces, such as polyethylene, ski soles, sound and video tapes, telephone cables and so forth.

16 Claims, No Drawings

MODIFIED GRAPHITE AND PROCESS FOR USING SAME

This is a continuation of application Ser. No. 863,972 filed Dec. 23, 1977, now abandoned.

BACKGROUND OF THE INVENTION

Graphite powders, both natural and synthetic, are naturally hydrophilic and are easily dispersed in water without the use of emulsifying or wetting agents. As a result these powders do not adhere well to hydrophobic surfaces especially when applied to such surfaces under wet conditions such as from an aqueous suspension.

Graphite has been extensively studied for many years and has been treated in numerous manners in attempts to alter or improve its physical, chemical and electrical properties to adapt it to specific end uses, and also as a matter of scientific investigation.

In applicant's studies of both natural and synthetic graphite powder, he has observed that the graphite particles or flakes have a dual characteristic. Each particle behaves as if part of its surface is hydrophobic and part of its surface is hydrophilic and it is the net effect of these individual particles when combined into a powder that results in the observed hydrophilic property of conventional graphite powders.

A cursory search of the vast amount of literature on graphite indicates that the net hydrophilic effect of the graphite can be rendered entirely hydrophobic, for example, by grinding the graphite under n-heptane for eight hours. Such a treatment is reported to render the graphite powder oleophilic, Proc. Roy. Soc. Lond. A. 314, 473-498 (476), (1970) A. J. Groszek.

Graphite has also been treated with many other polar and non-polar solvents of materials. Such additional treatments have been reported in THE JOURNAL OF PHYSICAL CHEMISTRY 71 No. 11, 3408-3413 (1967) Pierce and Ewing as well as in the A. J. Groszek publication above. The Pierce and Ewing publication does not, however, report any findings relating to the hydrophilic or hydrophobic properties of graphite.

There are probably other publications dealing with the treatment of graphite with both polar and non-polar materials and some may also report findings relating to the hydrophilic or hydrophobic properties of graphite, but the applicant is not aware of any such publications other than those reported herein. As noted above, applicant's search was cursory since the vast amount of literature on graphite rendered a detailed search economically prohibitive.

SUMMARY OF THE INVENTION

This invention relates to the treatment of conventional natural and synthetic graphite with non-polar or hydrophobic materials in the liquid or gas state to produce a graphite powder having a strong attraction for hydrophobic surfaces when applied thereto under dry or wet conditions, even from an aqueous or polar dispersion. The graphite film deposited on the hydrophobic surface is even more strongly hydrophobic than the graphite powder used to deposit the film. The invention includes solid hydrophobic surface having such a graphite film adhered thereto and in particular a hydrophobic ski sole having the treated graphite adhered thereto, sound and video tapes having the treated graphite adhered to the magnetic surface and/or to the reverse surface and to the hydrophobic insulating surface of telephone cables.

Such an applied graphite film can be utilized for its lubrication properties, its electrical properties (bleeding away electrostatic charges) or a combination of these properties. The treated graphite when applied as a film, or used in other forms, also imparts unexpected properties in certain areas of use which are not completely understood and which will be hereinafter discussed.

It is important to be able to apply graphite to a surface from a water dispersion free of emulsifying or wetting agents for many industrial uses. The use of emulsifying agents will not only interfere with the hydrophobic properties of the graphite film, but will also affect their adhesion to hydrophobic surfaces especially when the films are used under wet conditions, such as on ski soles. The use of emulsifying or wetting agents can also affect the base hydrophobic surface during application, for example, when applied and rubbed onto a hydrophobic ski wax surface. The treated graphite powders can be applied to a surface as a dry powder. This method, however, effects uniformity of the film, requires special equipment in many industrial areas, is inconvenient and, of course, messy. The graphite dispersants should be chosen for the particular end use so that the dispersant will not interfere with the hydrophobic surface to which the graphite is to be applied. For example, a non-aqueous dispersant should not be a solvent for the hydrophobic surface to which the graphite is to be applied. The invention, thus, does not exclude the use of non-aqueous dispersants nor the use of non-aqueous substances in conjunction with water so long as they do not interfere with the intended use of the graphite. For example, antifreeze liquids, such as isopropyl alcohol or ethyl alcohol, can be used alone or can be incorporated into a water dispersion.

DETAILED DESCRIPTION OF THE INVENTION

The graphite of this invention is prepared by treating conventional natural or synthetic graphite with a non-polar material in the liquid or gas state under conditions to render the graphite substantially hydrophobic or to impart to the graphite a net hydrophobic effect while retaining a sufficient hydrophilic effect to permit the graphite to be dispersed in water or alcohol without the use of emulsifying or wetting agents and applied to a surface from the water or alcohol dispersion.

The most important condition to achieve the desired property of the graphite is the amount of non-polar material used to treat the graphite. Obviously, a too small amount will not be sufficient to render the net effect of the graphite hydrophobic and a too large amount may render the graphite substantially hydrophobic so that it cannot be dispersed in water without using an emulsifying or wetting agent. Generally this amount will be between about 1% and 3% by weight of the non-polar substance based on the weight of the graphite. The amounts will, of course, vary somewhat depending mainly upon the particular non-polar substance being used since some substances, as is well known, are more polar or less polar than others. The optimum amount of any particular non-polar substance can be readily determined by routine experimentation by those skilled in the art to achieve the desired results.

The temperature or time of treatment is not particularly significant. Room temperature is preferred with non-polar materials which are in the liquid or gas state at that temperature. As to time, the non-polar substance is merely thoroughly mixed with the graphite, agitated for a few minutes and left to stand for a few hours or over night. The treated graphite can then be directly applied to a hydrophobic surface or dispersed in water or alcohol for subsequent use.

Almost any non-polar solvent or substance can be used to treat the graphite according to this invention. Non-polar substances are well known in the art. Some non-polar substances will work better than others not only due to the degree of polarity of the substance but for other reasons not fully understood. For example, the alkyl silicates or alkoxy silanes, particularly ethyl silicate (tetra ethyl ortho silicate) and tetra-n-propyl silane, appear to give the best results found so far even though its non-polar properties may not be as great as other materials which are more non-polar. Further examples of non-polar materials that can be used include hexane, mineral oil, and silicone oil. Hexane, however, although it greatly increases the affinity of the graphite for hydrophobic surfaces, such as polyethylene, does not appear to be lasting and the new properties disappear after a period of time, at least under the treatment conditions employed of merely agitating the graphite with the hexane and allowing it to stand for a few hours at room temperature.

As previously mentioned, the graphite should be treated with the non-polar material in the liquid or gas state. This does not exclude the use of normally solid materials if they are capable of being liquified, such as by raising the temperature. Thus, non-polar organic resins such as polyvinylidene fluoride (Kynar) can be used and the graphite treated as described in U.S. Pat. No. 4,051,075 or U.S. Pat. No. 3,992,558.

The graphite, before being treated, should be dry, that is substantially free from extraneous polar materials. This is especially true when the alkyl silicates are used since the alkyl silicates, such as tetra ethyl ortho silicate, tend to hydrolize which imparts polar properties to these monomers. Thus, it is especially important that when the alkyl silicates are being used that the graphite contain substantially no water or acid sites and that the ethyl silicate is not allowed to hydrolize to any significant degree before being used to treat the graphite.

The substrates to which the treated graphite can be applied are hydrophobic or non-polar substrates. As will be apparent to those in the art, some substrates which are considered to be hydrophobic do have some polar sites that may pick up water. When speaking of hydrophobic or non-polar substrates, the applicant is thus concerned with the net effect of the substrate which must be non-polar.

Polyester films, such as Mylar, are examples of hydrophobic substrates which are generally slightly polar. With these types of substrates it is preferred to treat dry graphite with an unhydrolized alkyl silicate for application thereto. Such a treated graphite would adhere to Mylar more than it will to itself, and the presence of debris or loose particles after application is at a minimum.

The amount of treated graphite used is not significant. To apply it dry, one simply rubs the dry powder onto the surface and wipes any excess. To apply it from an aqueous or alcohol solution, one merely mixes about 15 grams in about a 100 ml of water or alcohol, applies the dispersion to the surface with a little rubbing with a paper towel. Such films when applied to a hydrophobic surface adhere very strongly thereto and the graphite will not come off on the hands when handling. The films are resistant to alcohol and water and exhibit a uniform electrical conductivity. The films are also very thin and when applied to a clear surface, such as polyester or polyethylene film, the product is still transparent with a greyish haze.

The resistance of the films are very constant when applied to the same hydrophobic substrate. For example, when applied to polyethylene, the resistance is about 1000 ohm per square and on polyester (Mylar) about 6000 ohm per square. The resistance can be increased by diluting the graphite with a non-conductor, such as mica flakes. If conductivity is desired, care must be taken not to use too much mica so as to disrupt the conductivity of the films. A graphite-mica mixture of 1:1 by weight will generally increase the resistance of film on polyethylene to about 4000 to 5000 ohm per square.

The treated graphite which is net hydrophobic but water dispersible can also be used in water based cutting "oils" for lubrication.

SKIS

The mechanism of sliding on dry snow involves the development of a water lubrication layer on the snow crystal surface resulting from a combination of pressure and heat of friction, therefore the friction on dry snow (as is also the case for wet snow) is a function of the water adhesion of the contacting surfaces. For this reason ski surfaces are generally composed of strongly hydrophobic materials, such as polyethylene or parafin-based waxy compounds, e.g., ski wax on wood.

Another factor that is important on dry snow is the tribo-electric effect between the snow and the sliding surface. Thus, the very materials which are most desirable with respect to water repellency are also highly dielectric and tend to accumulate electric charges on their surfaces. These charges induce an opposite charge on the snow crystals causing an attraction, friction.

A combination of high hydrophobicity and high conductivity would accordingly be desirable for a ski surface or a ski-surface preparation. These two properties, however, are not readily combined without causing serious compromises. For example, it has been proposed to embed graphite in a ski surface as well as with ski preparation, such as waxes, to render the ski surfaces highly dielectric. However, when this is attempted the loading of graphite or other conductive material must be so high in order to render the surface conductive that the entire surface itself becomes substantially hydrophilic.

The treated graphite made according to this invention can be applied alone without the use of any binder, such as a resin or wax, to render the ski surface not only conductive, but without affecting the hydrophobic nature of the ski sole and in most instances to make it even more hydrophobic than the ski surface materials themselves. These graphite coatings, although very thin, are nonetheless strongly adherent and abrasion resistant and can be used both as a precoat to improve the bond of ski wax to polyolefin bases or to modify the waxed surfaces as well. The graphite coating on ski surfaces according to this invention gives a phenomenal glide, and without significantly inhibited uphill climbing.

When applying the treated graphite to a hydrophobic ski surface it is advantageous to apply it from a water suspension containing a small amount of an antifreeze material, such as isopropanol. A few drops of this suspension are placed on the ski sole surface and merely rubbed thereon with a paper towel, for example, until the surface exhibits a slight metallic sheen. The use of the antifreeze is very helpful in this use since if water alone was used to apply the graphite out-of-doors to a cold ski, it might well freeze on the surface. The treated graphite could be applied dry, however, this is very difficult and messy to do, particularly outdoors in the wind. The treated graphite can also be advantageously applied from an alcohol solution.

Although the treated graphite can be used directly on hydrophobic ski soles, best results to date have been obtained by applying the graphite to a hydrophobic polyethylene ski sole and then applying a conventional ski wax on top of the graphite coating. This alone will improve the glide of the skis, but it is advantageous to apply a second graphite coating on top of the ski wax.

With respect to the use of the graphite coating to a polyethylene surface, the most desirable procedure is to treat dry graphite powder by exposing it to vapors of tetra ethyl ortho silicate (1–2% by weight) before applying it as a dry powder or from a liquid dispersion. This product gives superior adhesion and water repellency even when applied to polyethylene from an alcohol suspension.

RECORDING TAPES

Recording tapes are generally composed of hydrophobic plastic base such as polyester (Mylar) having adhered to one side a recordable surface or composition which is generally an iron oxide type coating. In recording or utilizing such tapes, they must be mechanically fed, sometimes at high speeds, and lubrication of such tapes has been a problem. Many tapes today have adhered to the non-recording surface a graphite loaded resin, for lubrication purposes. Although such a coating seems to lubricate, it is opaque and is time-consuming and difficult to apply, and obviously cannot be applied to the recording surface.

The treated graphite made according to this invention can be readily applied to Mylar film by lightly rubbing it on to the film in a dry state. It can, of course, be applied from a polar suspension, as previously discussed. Such a composition for the treatment of the tapes can be prepared in the same manner described above by exposing commercial graphite to an equilibration to about 1 to 3% by weight of tetra ethyl ortho silicate (15 drops on 15 grams of graphite) or other non-polar substances, and allowed to stand overnight. When the treated graphite is applied to Mylar in the dry state (on recording tapes), it is advantageous to mix it with a mica powder in about a 1:1 ratio. The combination of adhesion (mark-off) transparency, conductivity and lubricity are very favorable for tape applications.

The optimized treatment for Mylar film to date involves first wiping the Mylar film with about 1% tetra ethyl ortho silicate in isopropyl alcohol and then to lightly rub the treated graphite as prepared above onto the Mylar surface. The surface can be cleaned of any loose particles by wiping it lightly with a damp paper towel.

The invention includes coating the treated graphite, without the use of a binder, directly to a recording surface of the tape. In sound recordings such a treatment has been found to improve sound quality and to materially diminish background noises. It is, of course, highly surprising that such a treated graphite could be placed directly on a recording surface let alone give improved sound and substantially eliminate background noises. Why such a result is obtained by applying the treated graphite to the recording surface is not understood.

SIGNAL-CARRYING CABLES

Signal-carrying electrical cables or lines, such as conventional telephone cables are generally insulated with a hydrophobic insulation such as polyethylene. As is well known, the industry has been faced with considerable interference between lines. The message on one line will transfer or go on to another line in part or in whole. This is generally referred to in the art as crosstalk. This invention includes the application of treated graphite in the same manner as described above for recording tapes on to the outside of the insulation of the signal-carrying cable or line. It has been found that this treatment substantially eliminates cross-talk, particularly in telephone cables.

Although the invention has been described with respect to the limited treatment of the graphite powder to impart a net hydrophobic effect of graphite while retaining sufficient hydropholicity to maintain the water dispersibility thereof without emulsifying agents, and although this is a considerable advantage, in some instances, as will be appreciated by those skilled in the art, the graphite can be treated with an excess non-polar solvent to render the graphite substantially hydrophobic where dispersibility in a polar material is not desired or necessary. Such a hydrophobic graphite could be applied to the skis, tapes, etc. if desired.

EXAMPLE 0.40 parts by weight of tetra ethyl ortho silicates were added to 15 parts by weight of graphite (Dylan GPF manufactured by Eylon Industries, Inc.). The mixture was agitated for a few minutes to insure uniformity of the mixture and allowed to stand for about three hours. The following day the treated graphite was dispersed in 85 parts by weight water and 15 parts by weight isoproponal. The isoproponal is not necessary and is only added in this instance to prevent the water from freezing. When freezing is not a problem the alcohol can be eliminated or the composition can be used dry as described above. This composition, or one very similar to it, was used in the above example on skis and recording tapes in the dry form, in an aqueous suspension, in an alcohol suspension or a mixed suspension in water or alcohol. A composition made according to U.S. Pat. No. 3,992,558 using 2.5% by weight polyvinylidene fluoride (Kynar), such as by substituting graphite for the carbon in Example 1, was also used in the above examples, either in the dry form or in polar dispersions on skis, recording tapes and signal cables.

Although the percent of non-polar material preferred has been stated to be between about 1% to 3% by weight based on the graphite, the exact parameters have not been determined for any particular non-polar material. It is thought that 5% of ethyl silicate might well render the graphite substantially all hydrophobic, but as much as 10% ethyl silicate would certainly do so.

I claim:

1. A hydrophobic substrate having a coating of graphite adhered thereto in the absence of a binding agent, said graphite particles having at least two hydrophobic surfaces, one surface being adhered to the hydrophobic substrate, and another exposed, and a sufficient amount of hydrophilic properties to permit dispersibility of the graphite in a polar liquid, said graphite powder being produced by treating the graphite particles with a non-polar water immiscible material in the liquid or gas state in a sufficient amount to render the net effect of the graphite powder substantially hydrophobic but to retain a sufficient amount of hydrophilic properties of the graphite to permit dispersibility of the graphite in a polar liquid.

2. The product according to claim 1 in which the hydrophobic substrate is a sound or video tape surface.

3. The product according to claim 2 in which the graphite is adhered to the recordable or recorded surface thereof.

4. The product according to claim 1 in which the hydrophobic surface is a signal carrying electrical line insulated with a hydrophobic material.

5. The product according to claim 4 in which the line is a telephone line.

6. The product of claim 1 in which the hydrophobic substrate is a ski sole.

7. The product of claim 6 in which the hydrophobic substrate is wax.

8. The product of claim 6 in which the hydrophobic substrate is polyethylene.

9. A hydrophobic substrate having a coating of graphite adhered thereto in the absence of a binding agent, said graphite particles having at least two hydrophobic surfaces sufficient to render the net effect of the graphite powder substantially hydrophobic but having a sufficient amount of the hydrophilic properties to permit dispersibility of the graphite in a polar liquid.

10. The product according to claim 9 in which the hydrophobic substrate is a sound or video tape surface.

11. The product according to claim 10 in which the graphite is adhered to the recordable or recorded surface thereof.

12. The product according to claim 9 in which the hydrophobic surface is a signal carrying electrical line insulated with a hydrophobic material.

13. The product according to claim 9 in which the line is a telephone line.

14. The product of claim 9 in which the hydrophobic substrate is a ski sole.

15. The product of claim 14 in which the hydrophobic substrate is wax.

16. The product of claim 14 in which the hydrophobic substrate is polyethylene.

* * * * *

UNITED STATES PATENT AND TRADEMARK OFFICE
CERTIFICATE OF CORRECTION

PATENT NO. : 4,321,295
DATED : March 23, 1982
INVENTOR(S) : Robert Smith-Johannsen It is certified that error appears in the above—identified patent and that said Letters Patent is hereby corrected as shown below:

Column 6, line 37, reads "Eylon Industries", should read --Dylon Industries--

Signed and Sealed this

Twelfth Day of October 1982

[SEAL]

Attest:

Attesting Officer

GERALD J. MOSSINGHOFF

Commissioner of Patents and Trademarks